United States Patent [19]

Wolf

[11] 4,201,119
[45] May 6, 1980

[54] FILTER PLEATING MACHINE
[75] Inventor: Roger P. Wolf, Mars, Pa.
[73] Assignee: Mine Safety Appliances Company, Pittsburgh, Pa.
[21] Appl. No.: 940,552
[22] Filed: Sep. 8, 1978
[51] Int. Cl.$^2$ ............................ B31B 3/26; B31F 1/22
[52] U.S. Cl. ........................................ 93/60; 93/84 R; 156/204; 156/474
[58] Field of Search ................. 93/84 R, 1 C, 60; 210/493 R, 493 FR; 156/204, 474

[56] References Cited
U.S. PATENT DOCUMENTS

| | | | |
|---|---|---|---|
| 1,233,377 | 7/1917 | Littman | 156/474 X |
| 2,302,722 | 11/1942 | Smith | 156/474 |

FOREIGN PATENT DOCUMENTS

| | | | |
|---|---|---|---|
| 1277588 | 6/1972 | United Kingdom | 156/474 |
| 1478463 | 6/1977 | United Kingdom | 156/474 |

*Primary Examiner*—William R. Briggs
*Attorney, Agent, or Firm*—Brown, Flick & Peckham

[57] ABSTRACT

A conventional filter pleating machine has a laterally movable pusher bar and a vertically movable stripper bar parallel to it and normally spaced laterally from it above a table, with a vertically movable breaker bar between the other two bars and normally below the table top. The invention lies in providing the lower edges of the pusher bar and the stripper bar with a plurality of longitudinally spaced upwardly extending slots for receiving parallel separator tapes above a filter strip extending along the table beneath those two bars, and also in providing the upper edge of the breaker bar with longitudinally spaced downwardly extending slots for receiving parallel separator tapes below the filter strip when the breaker bar is raised, whereby the pleats in the filter strip will be separated by the separator tapes folded between them.

1 Claim, 10 Drawing Figures

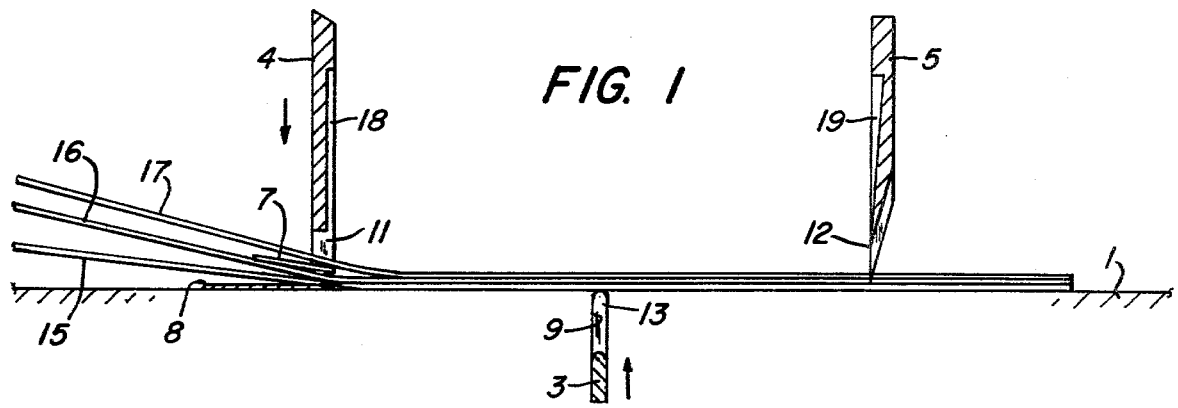
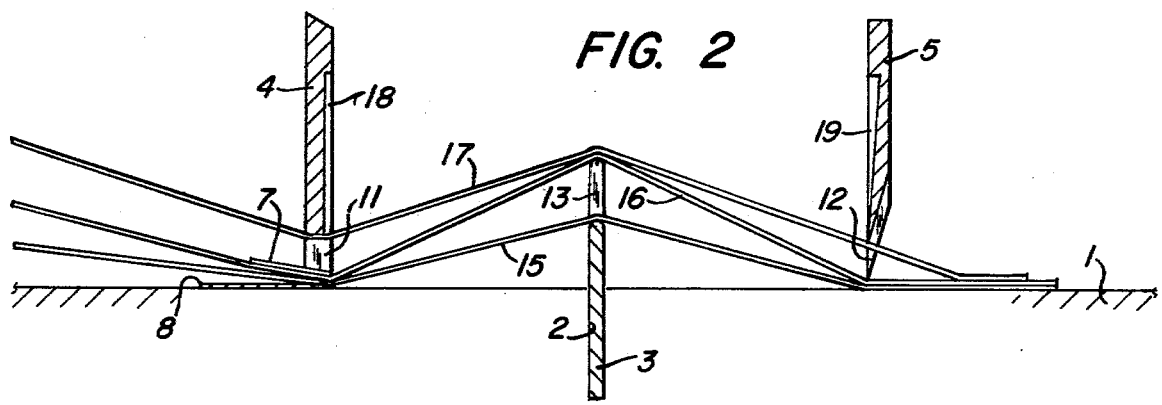
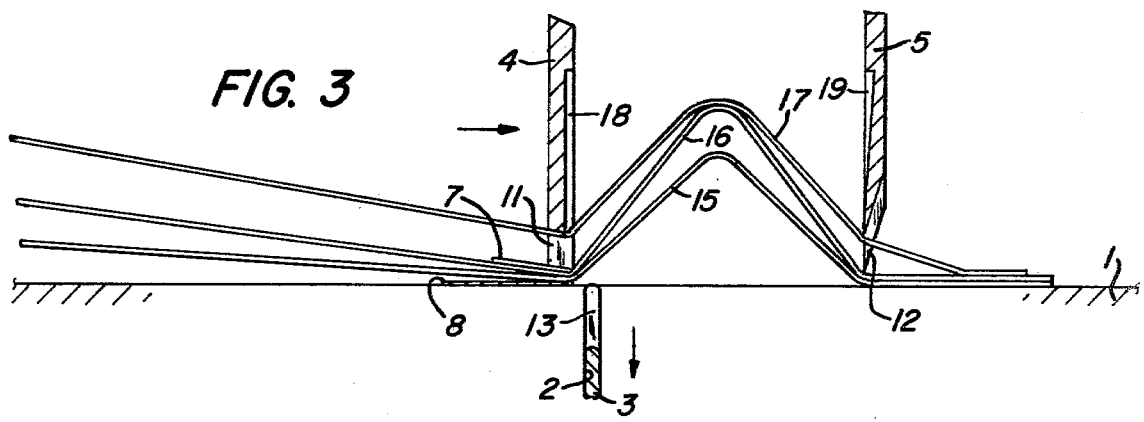
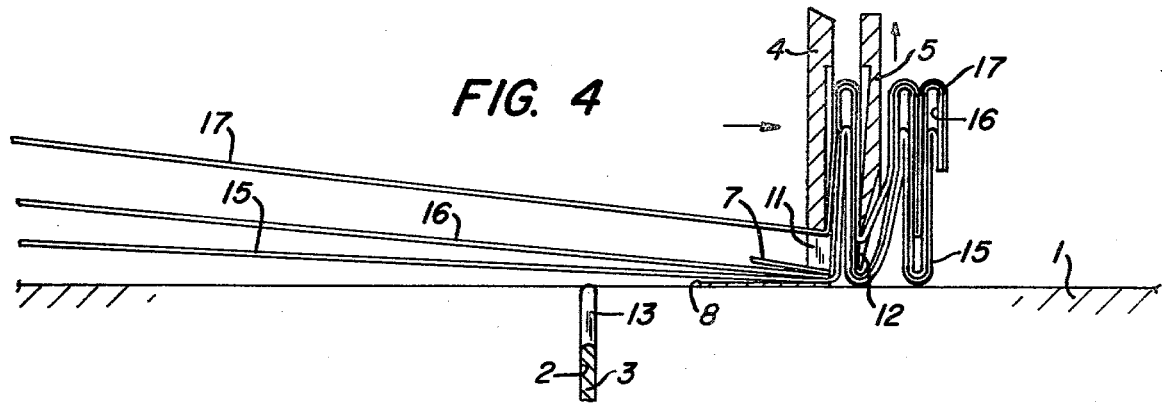

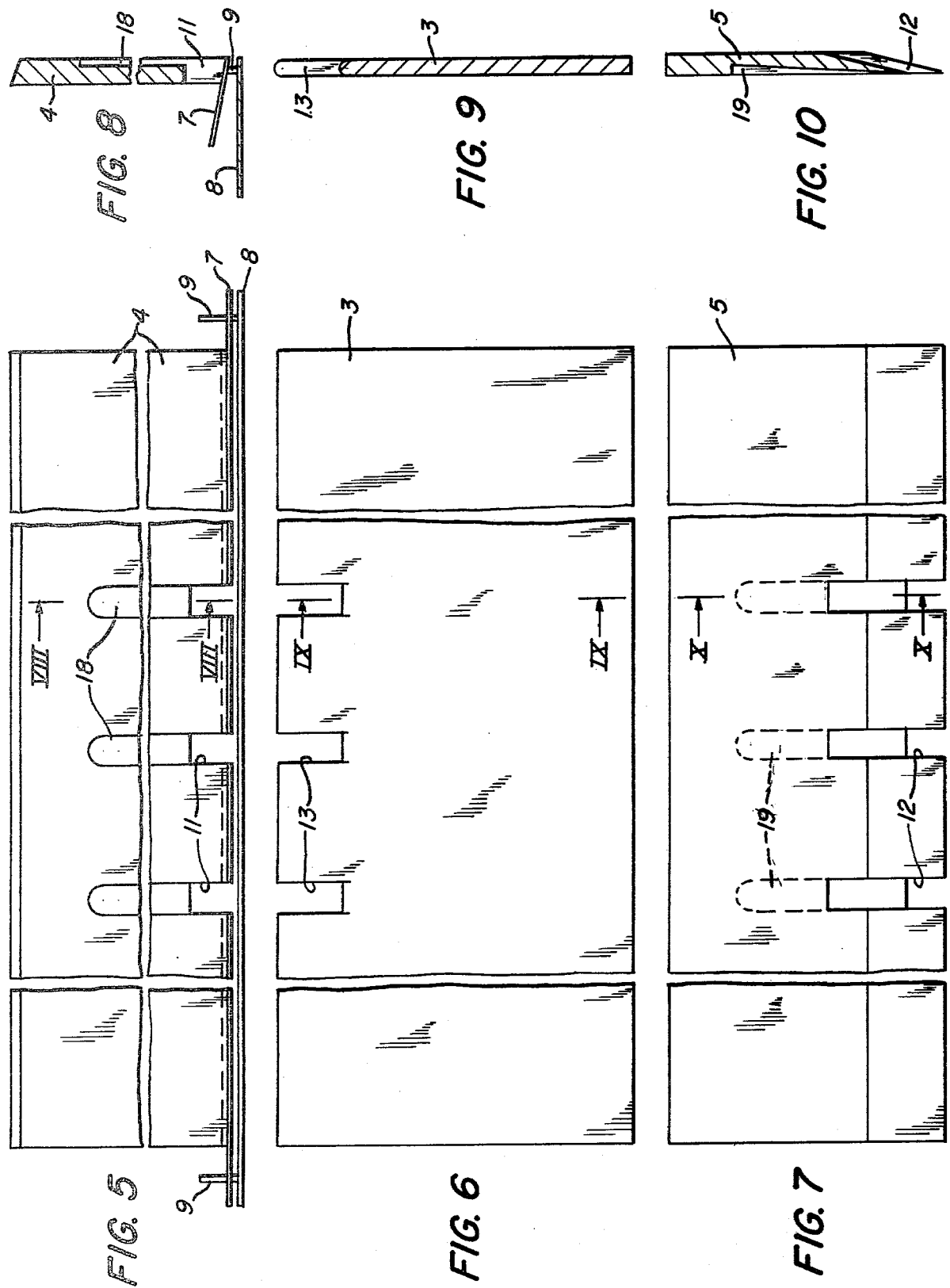

FILTER PLEATING MACHINE

There is a conventional type of filter pleating machine in which a strip of filter paper or the like extends along a table beneath a pusher bar and a stripper bar that are parallel to each other. Between these bars there is a vertically movable breaker bar that normally is below the table top. The breaker bar is raised to lift the overlying portion of the filter strip from the table. Then the bar is lowered and the pusher bar close a clamp that clamps onto the filter strip, and then the bar and clamp move toward the stripper bar to form a fold or pleat in the strip. The stripper bar then rises and descends between the pleat and the pusher bar to move the pleat to the opposite side of the stripper bar. The clamp is released from the strip and the clamp and pusher bar return to their original positions to repeat the cycle in order to form the next pleat.

It has been proposed to space the opposing sides of the pleats apart by means of separator tapes that extend along both sides of the filter strip. It was thought that these tapes could be pleated simultaneously with the filter strip, but it was found that the strip tended to tear where the inside of its folds were engaged by the tape folds.

It is among the objects of this invention to adapt a conventional filter pleating machine so that it can pleat separator tapes at the same time it pleats a filter strip but without tearing the latter.

The preferred embodiment of the invention is illustrated in the accompanying drawings, in which FIG. 1 is a fragmentary vertical section of a pleating machine prepared for pleating;

FIGS. 2, 3 and 4 are similar views showing the machine parts in successive positions during the pleating operation;

FIGS. 5, 6 and 7 are fragmentary side views of the pusher bar, breaker bar and stripper bar, respectively; and FIGS. 8, 9 and 10 are vertical sections of the three bars in the same order.

Referring to the drawings, a table 1 of a conventional pleating machine has a vertical slot 2 extending across it and in this slot is a vertically movable breaker bar 3. The bar can be moved from a position below or flush with the surface of the table to a higher position by any suitable means, such as cams.

On both sides of the table slot and spaced therefrom are two bars parallel to the breaker bar. One of these bars in a pusher bar 4 and the other a stripper bar 5. The pusher bar can be moved up and down a short distance by cams or the like and it carries along its bottom a clamp. The clamp is formed from vertically spaced upper and lower plates 7 and 8. The lower plate engages the table and is urged away from the bar by a spring or by gravity. In the latter case, as shown in FIGS. 5 and 8, vertical pins 9 mounted on the ends of the lower plate are slidably disposed in holes in the ends of the upper plate, which is rigidly connected to the bottom of the pusher bar. When the bar is moved downwardly, it presses the upper plate toward the lower plate.

In accordance with this invention, the pusher bar has a plurality of longitudinally spaced upwardly extending slots 11 in its lower edge. The lower edge of the stripper bar likewise is provided with a group of such slots 12 aligned with those in the pusher bar. The upper edge of the breaker bar is provided with a row of longitudinally spaced downwardly extending slots 13. As shown in FIG. 1, a plurality of separator tapes 15 extend through the open clamp and along the table across the lowered breaker bar 3 above its slots 13 and then beneath the stripper bar 5. Overlying these tapes is a strip 16 of filter material, which also extends through the clamp. Overlying the filter strip are parallel separator tapes 17 that are threaded through the slots 11 in the pusher bar and also extend through the slots 12 in the stripper bar. The stripper bar clamps the filter strip and the lower tapes against the table.

OPERATION

With everything in the positions shown in FIG. 1, the breaker bar 3 is raised, which causes it to lift the filter strip and the upper tapes and to bring the bottoms of its slots 13 into engagement with the lower tapes which are then raised also. During this lifting of the strip and tapes they are pulled through the open clamp. When the breaker bar reaches its upper position, the pusher bar 4 is lowered, as shown in FIG. 2, to clamp the filter strip and the lower tapes and then, after the breaker bar has been lowered, the pusher bar is moved toward the stripper bar as shown in FIG. 3 to complete folding the material between the two bars that are above the table. The pleat is pressed between the two bars as shown in FIG. 4, in which a couple of preceding pleats also are shown. The pusher bar and the stripper bar are provided with opposed side slots 18 and 19 that receive the folded upper tapes so that the filter strip folds can be made more compact. In practice, the pusher bar and stripper bar move closer together than shown in FIG. 4 where the thickness of the filter strip and tapes had to be exaggerated.

Upon completion of the pleat the stripper bar is raised above it. The tendency of the pleat to expand will cause its upper portion to move away from the pusher bar, whereupon the stripper bar descends between the pleat and the pusher bar to push the pleat to the right and to again clamp the filter strip and the lower tapes against the table. The pusher bar is raised far enough to release the clamp from the strip and lower tapes and then the bar moves back to its starting position, whereupon the breaker bar is raised again to start the formation of the next pleat.

Since the depth of the folds of the tapes is less than the depth of the folds of the filter strip, the tapes do not interfere with folding the filter strip and therefore they do not cause tearing or undue strain at the folds of the strip.

According to the provisions of the patent statutes, I have explained the principle of my invention and have illustrated and described what I now consider to represent its best embodiment. However, I desire to have it undestood that, within the scope of the appended claims, the invention may be practiced otherwise than as specifically illustrated and described.

I claim:

1. In a filter pleating machine in which a laterally and vertically movable pusher bar and a parallel vertically movable stripper bar are normally spaced apart laterally above a table, and a vertically movable breaker bar is between the other two bars and normally below the table top in a plane parallel to the other two bars, the improvement in which the pusher bar and the stripper bar each has a plurality of longitudinally spaced upwardly extending slots in its lower edge for receiving parallel separator tapes above a filter strip extending along the table beneath said bars, and the breaker bar has a plurality of longitudinally spaced downwardly extending slots in its upper edge for receiving parallel separator tapes below such a strip when the breaker bar is raised, said tapes being unattached to said strip, said upwardly extending slots having upper end walls for engagement by the upper tapes after said breaker bar has moved upwardly a predetermined distance to start forming a fold in the filter strip, and said downwardly extending slots having lower end walls for engaging and lifting the lower tapes after said breaker bar has moved upwardly a predetermined distance, whereby to form tape folds of less depth than the filter folds.

* * * * *